United States Patent [19]
Masaki et al.

[11] Patent Number: 5,019,984
[45] Date of Patent: May 28, 1991

[54] VEHICLE WHEEL SLIP CONTROL SYSTEM

[75] Inventors: Syouichi Masaki, Anjo; Hiromi Maehata, Kariya; Kazunori Sakai, Nagoya; Tatsuo Sugitani, Mishima, all of Japan

[73] Assignees: Nippondenso Co., Ltd., Kariya; Toyota Jidosha Kabushiki Kaisha, Toyota, both of Japan

[21] Appl. No.: 366,656

[22] Filed: Jun. 15, 1989

Related U.S. Application Data

[63] Continuation of Ser. No. 89,173, Aug. 25, 1987, abandoned.

[30] Foreign Application Priority Data

Aug. 27, 1986 [JP] Japan ................................ 61-200856

[51] Int. Cl.[5] .............................................. B60T 8/60
[52] U.S. Cl. .................................. 364/426.02; 303/95; 303/97; 303/103
[58] Field of Search ...................... 364/426.01, 426.02, 364/426.03; 180/197; 303/95-97, 103

[56] References Cited

U.S. PATENT DOCUMENTS

| | | | |
|---|---|---|---|
| 3,950,036 | 4/1976 | Fink et al. | 303/111 |
| 4,321,676 | 3/1982 | Ohmori et al. | 303/97 |
| 4,439,832 | 3/1984 | Sato et al. | 364/426.02 |
| 4,675,819 | 6/1987 | Fennel | 364/426.02 |
| 4,762,375 | 8/1988 | Maki et al. | 303/96 |
| 4,763,960 | 8/1988 | Uchida et al. | 303/97 |
| 4,773,014 | 9/1988 | Hagiya et al. | 364/426.02 |
| 4,787,682 | 11/1988 | Muto | 364/426.01 |

FOREIGN PATENT DOCUMENTS

| | | |
|---|---|---|
| 1952895 | 10/1988 | Fed. Rep. of Germany . |
| 49-109789 | 10/1974 | Japan . |
| 1414341 | 11/1975 | United Kingdom . |

Primary Examiner—Gary Chin
Attorney, Agent, or Firm—Cushman, Darby & Cushman

[57] ABSTRACT

Sensors detect rotational speeds of respective vehicle wheels. A slip detection reference value is calculated from the detected rotational speeds of the vehicle wheels. Acceptable slip ranges for the respective vehicle wheels are determined in accordance with the calculated slip detection reference value. The rotational speeds of the vehicle wheels are compared with the corresponding acceptable slip ranges respectively. Slip controls of the respective vehicle wheels are performed when the rotational speeds of the vehicle wheels reside outside the corresponding acceptable slip ranges respectively. The highest of at least two of the rotational speeds of the vehicle wheels is selected. Differences between the respective rotational speeds of the vehicle wheels and the selected highest vehicle wheel rotational speed are calculated. The slip detection reference value is corrected in accordance with the respective calculated differences.

21 Claims, 5 Drawing Sheets

VEHICLE WHEEL SLIP CONTROL SYSTEM

This is a continuation of application Ser. No. 089,173, filed Aug. 25, 1987, abandoned.

BACKGROUND OF THE INVENTION

1. Field of the Invention

This invention relates generally to a vehicle wheel slip control system, and specifically to a vehicle wheel slip control system effective during a vehicle turn.

2. Description of the Prior Art

General vehicle antiskid systems adjust brakes to prevent vehicle wheel lock up or unacceptable vehicle wheel slip during applications of the brakes. In these antiskid systems, a vehicle speed and a vehicle wheel rotational speed are compared to determine the vehicle wheel slip ratio. Specifically, brake control to prevent vehicle wheel lock up is performed when the vehicle wheel rotational speed is lower than the vehicle speed by a reference value corresponding to an unacceptable slip ratio. Generally, vehicle wheels are independently exposed to such brake controls.

During vehicle turns, rotational speeds of vehicle wheels at one side of the vehicle differ from rotational speeds of vehicle wheels at the other side of the vehicle. Such a difference in rotational speed between the vehicle wheels tends to cause unreliable operation of the antiskid system.

Japanese published unexamined patent application 49-109789 discloses an improved antiskid system provided with a sensor detecting a vehicle turn. In this improved antiskid system, during a vehicle turn, reference values for determining the vehicle wheel slip ratios are corrected in accordance with output of the vehicle turn sensor to maintain reliable antiskid operation. The improved antiskid system is complicated, since the vehicle turn sensor is added.

In cases where diameters of vehicle wheels are different due to causes such as a difference between air pressures within the tires and a difference in wear between the tires, rotational speeds of the vehicle wheels are liable to differ from each other even when the vehicle is required to travel straight. This difference in the vehicle wheel rotational speeds also causes unreliable antiskid control. Even the improved system of Japanese patent application 49-109789 can not prevent such unreliable antiskid control.

SUMMARY OF THE INVENTION

It is an object of this invention to provide a simple vehicle wheel slip control system effective during a vehicle straight travel and also during a vehicle turn.

It is another object of this invention to provide a reliable vehicle wheel slip control system.

In a vehicle wheel slip control system of this invention, sensors detect rotational speeds of respective vehicle wheels. A slip detection reference value is calculated from the detected rotational speeds of the vehicle wheels. Acceptable slip ranges for the respective vehicle wheels are determined in accordance with the calculated slip detection reference value. The rotational speeds of the vehicle wheels are compared with the corresponding acceptable slip ranges respectively. Slip controls of the respective vehicle wheels are performed when the rotational speeds of the vehicle wheels reside outside the corresponding acceptable slip ranges respectively. The highest of at least two of the rotational speeds of the vehicle wheels is selected. Differences between the respective rotational speeds of the vehicle wheels and the selected highest vehicle wheel rotational speed are calculated. The slip detection reference value is corrected in accordance with the respective calculated differences.

DESCRIPTION OF THE BASIC PREFERRED EMBODIMENT

Figure 1:
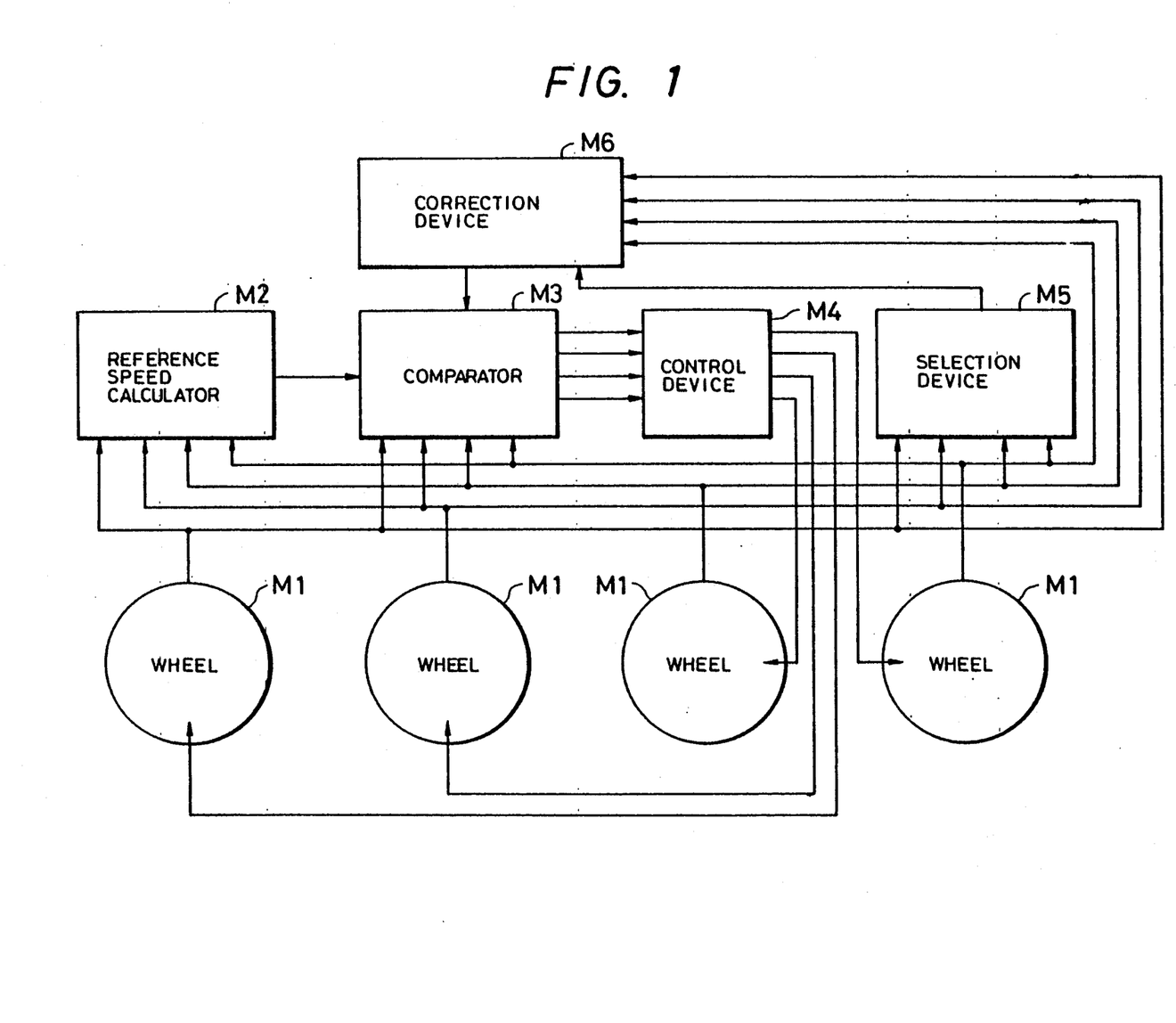
FIG. 1 is a diagram of a vehicle wheel slip control system according to a basic embodiment of this invention.

With reference to FIG. 1, a vehicle wheel slip control system according to a basic embodiment of this invention includes a reference speed calculator M2 determining a slip detection reference speed in accordance with rotational speeds of vehicle wheels M1. A device M3 compares the rotational speeds of the respective vehicle wheels M1 with speed ranges dependent on the reference speed. When the comparator M3 detects that the rotational speeds of the respective vehicle wheels M1 reside outside the speed ranges, a device M4 performs slip controls of the respective vehicle wheels M1.

A device M5 selects the highest of the rotational speeds of predetermined at least two of the vehicle wheels M1. A device M6 corrects the reference speed in accordance with differences between the selected highest rotational speed and the rotational speeds of the respective vehicle wheels M1.

As described previously, the reference speed calculator M2 determines a slip detection reference speed in accordance with the rotational speeds of the vehicle wheels M1. For example, the reference speed calculator M2 regards the highest of the vehicle wheel rotational speeds as a vehicle speed and calculates the reference speed in accordance with the vehicle speed. The reference speed may be varied in accordance with decelerations of the vehicle wheels M1.

The comparator M3 determines whether or not slip controls of the respective vehicle wheels M1 are necessary by comparing the rotational speeds of the respective vehicle wheels M1 with the reference speed. For example, when one of the vehicle wheel rotational speeds is lower than the reference speed, the comparator M3 judges the related vehicle wheel to be in an unacceptable slip state and supplies the control device M4 with data which induces a decrease in the brake force applied to the related vehicle wheel M1.

As described previously, the device M5 selects the highest of the rotational speeds of predetermined at least two of the vehicle wheels M1. The device M6 corrects the reference speed in accordance with differences between the selected highest rotational speed and the rotational speeds of the respective vehicle wheels M1. This correction of the reference speed is designed in view of a difference in rotational speed between vehicle wheels at one side of the vehicle and vehicle wheels at the other side of the vehicle which occurs under vehicle cornering conditions or during vehicle turns.

The correction of the reference speed enables the device M4 to perform slip controls of the respective vehicle wheels which allow for a difference in rotational speed between the vehicle wheels under vehicle cornering conditions or during vehicle turns. In addition, the slip controls of the respective vehicle wheels are performed on the basis of only the vehicle wheel rotational speed data.

DESCRIPTION OF THE SPECIFIC PREFERRED EMBODIMENT

Figure 2:
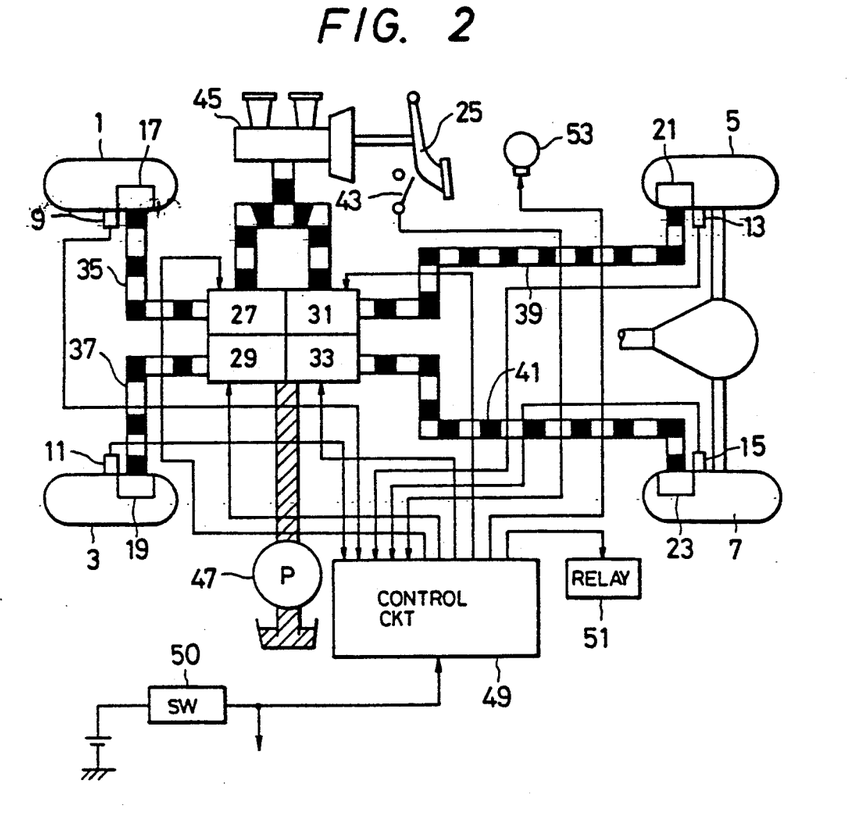
FIG. 2 is a diagram of a vehicle wheel slip control system according to a specific embodiment of this invention.

FIG. 2 shows a vehicle wheel slip control system according to a specific embodiment of this invention. In this specific embodiment, the vehicle wheel slip control system is applied to a front wheel steering and rear wheel drive automotive vehicle having four wheels. In such an automotive vehicle, front vehicle wheels constitute idler wheels. A vehicle wheel slip control system of this invention may also be applied to other vehicles.

As shown in FIG. 2, an automotive vehicle has a front-right wheel 1, a front-left wheel 3, a rear-right wheel 5, and a rear-left wheel 7. Rotational speed sensors 9, 11, 13, and 15 associated with the vehicle wheels 1, 3, 5, and 7 output pulse signals representing rotational speeds of the vehicle wheels 1, 3, 5, and 7 respectively. For example, the vehicle wheel speed sensors 9, 11, 13, and 15 are of the electromagnetic pickup type or the photoelectric type.

Hydraulic brake units 17, 19, 21, and 23 are associated with the vehicle wheels 1, 3, 5, and 7 respectively. Hydraulic pressures are applied via hydraulic lines 35, 37, 39, and 41 to the brake units 17, 19, 21, and 23 in accordance with operation of a brake pedal 25 or with operations of hydraulic pressure adjustment actuators 27, 29, 31, and 33 of the electromagnetic solenoid operated type. The hydraulic pressures applied to the brake units 17, 19, 21, and 23 cause corresponding brake forces applied to the vehicle wheels 1, 3, 5, and 7. These brake forces are adjustable via the actuators 27, 29, 31, and 33, and also via the brake pedal 25.

A stop switch 43 associated with the brake pedal 25 senses the position of the brake pedal 25. Specifically, the stop switch 43 generates an ON signal when the brake pedal 25 is depressed to brake the vehicle. The stop switch 43 generates an OFF signal when the brake pedal 25 is undepressed to release the vehicle from the brake. A hydraulic cylinder 45 mechanically connected to the brake pedal 25 is controllable via the brake pedal 25. The hydraulic cylinder 45 is hydraulically connected to the brake units 17, 19, 21, and 23. The depression of the brake pedal 25 causes a hydraulic pressure in the hydraulic cylinder 45 which normally allows the vehicle wheels 1, 3, 5, and 7 to be braked. An electrically-powered hydraulic pump 47 serves as a source generating a hydraulic pressure used for slip controls. An electronic control circuit 49 electrically connected to the actuators 27, 29, 31, and 33 serves to adjust the actuators 27, 29, 31, and 33. The adjustments of the actuators 27, 29, 31, and 33 allow controls of the hydraulic pressures applied to the brake units 17, 19, 21, and 23 from the hydraulic cylinder 45 or from the hydraulic pump 47. Accordingly, the brake forces applied to the respective vehicle wheels 1, 3, 5, and 7 are independently controllable via the adjustments of the actuators 27, 29, 31, and 33.

A main relay 51 switches the connection between an electric power supply and electromagnetic solenoids of the actuators 27, 29, 31, and 33 in accordance with an output signal from the electronic control circuit 49. When a malfunction occurs in the vehicle wheel slip control system, an indicator lamp 53 is activated by an output signal from the electronic control circuit 49 to inform the vehicle driver of the occurrence of the malfunction. For example, the malfunction consists of a wire breaking of the electromagnetic solenoids of the actuators 27, 29, 31, and 33 or a wire breaking of the vehicle wheel speed sensors 9, 11, 13, and 15.

The electronic control circuit 49 is supplied with an electric power when an ignition switch 50 is closed or turned on. The electronic control circuit 49 receives the signals from the vehicle wheel speed sensors 9, 11, 13, and 15, and the signal from the stop switch 43. The electronic control circuit 49 performs calculation process for slip detection and slip control, and other calculation processes in accordance with the received signals and outputs signals for controlling the actuators 27, 29, 31, and 33, the main relay 51, and the indicator lamp 53.

Figure 3:
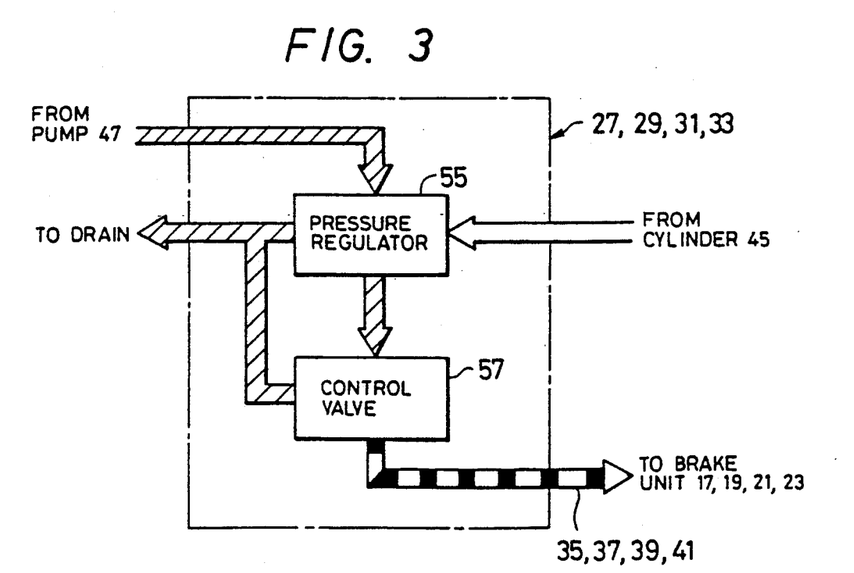
FIG. 3 is a diagram of each of the actuators of FIG. 2.

The actuators 27, 29, 31, and 33 have similar designs. As shown in FIG. 3, each of the actuators 27, 29, 31, and 33 includes a regulator 55 and a control valve 57. The regulator 55 includes an electromagnetic valve which selects one of the hydraulic pressure supplied from the hydraulic cylinder 45 and the hydraulic pressure supplied from the hydraulic pump 47 in accordance with a signal outputted by the electronic control circuit 49. The regulator 55 derives a fixed hydraulic pressure applied to the control valve 57. The control valve 57 includes an electromagnetic solenoid for driving a valve member. The control valve 57 is changeable among three positions in accordance with a signal outputted by the electronic control circuit 49. When the control valve 57 assumes a first position, the hydraulic passage 35, 37, 39, or 41 is exposed to the pressure from the regulator 55 so that the hydraulic pressure applied to the brake unit 17, 19, 21, or 23 usually increases. When the control valve 57 assumes a second position, the hydraulic passage 35, 37, 39, or 41 is connected to a drain so that the hydraulic pressure applied to the brake unit 17, 19, 21, or 23 usually decreases. When the control valve 57 is in a third position, the hydraulic passage 35, 37, 39, or 41 is blocked or isolated so that the hydraulic pressure applied to the brake unit 17, 19, 21, or 23 remains essentially constant. The brake units 17, 19, 21, and 23 include respective brake wheel cylinders exposed to the hydraulic pressures applied via the actuators 27, 29, 31, and 33. The vehicle wheels 1, 3, 5, and 7 are subjected to brake forces dependent on the hydraulic pressures applied to the brake wheel cylinders of the brake units 17, 19, 21, and 23 respectively. The hydraulic pressures applied to the brake units 17, 19, 21, and 23, and also the brake forces applied to the vehicle wheels 1, 3, 5, and 7 are controlled in accordance with the signals outputted from the electronic control circuit 49 to the actuators 27, 29, 31, and 33 respectively.

Figure 4:
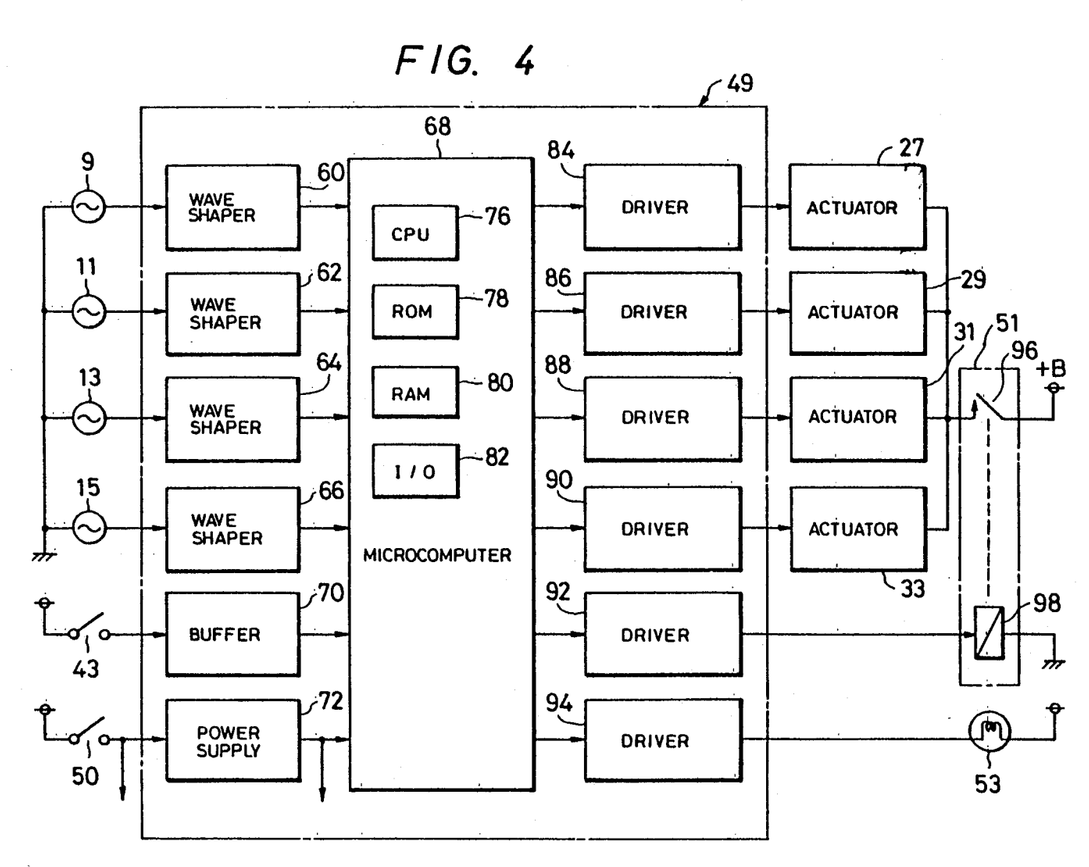
FIG. 4 is a block diagram of an electric portion of the vehicle wheel slip control system of FIG. 2.

As shown in FIG. 4, the electronic control circuit 49 includes wave shapers or wave shaping amplifiers 60, 62, 64, and 66 converting output signals from the vehicle wheel speed sensors 9, 11, 13, and 15 into pulse signals fit to be processed by a microcomputer 68. A buffer 70 temporarily holds output signal from the stop switch 43. When the ignition switch 50 is closed or turned on, a power supply circuit 72 feeds a constant voltage to the microcomputer 68 and other devices. The microcomputer 68 includes a combination of a central processing unit (CPU) 76, a read-only memory (ROM) 78, a random-access memory (RAM) 80, and an input/output (I/0) circuit 82. The signals outputted by the devices 60, 62, 64, 66, and 70 are inputted into the I/0 circuit 82. The microcomputer 68 generates control signals in accordance with the input signals. The I/0 circuit 82 outputs these control signals to drivers or drive circuits 84, 86, 88, 90, 92, and 94 respectively.

The devices 84, 86, 88, and 90 drive the electromagnetic solenoids of the actuators 27, 29, 31, and 33 in accordance with the input signals supplied from the microcomputer 68. The main relay 51 includes a normally open switch 96 and a control winding 98. The relay switch 96 is connected between the power supply and the electromagnetic solenoids of the actuators 27, 29, 31, and 33. The drive circuit 92 energizes and de-energizes the relay winding 98 in accordance with the input signal supplied from the microcomputer 68. When the relay winding 98 is energized, the relay switch 96 is closed so that the electromagnetic solenoids of the actuators 27, 29, 31, and 33 can be powered. In this case, the actuators 27, 29, 31, and 33 operate in accordance with signals supplied from the drive circuits 84, 86, 88, and 90. When the relay winding 98 is de-energized, the relay switch 96 is opened so that the electromagnetic solenoids of the actuators 27, 29, 31, and 33 is deactivated independent of the signals supplied from the drive circuits 84, 86, 88, and 90. The drive circuit 94 activates and deactivates the indicator lamp 53 in accordance with the input signal supplied from the microcomputer 68.

Figure 5:
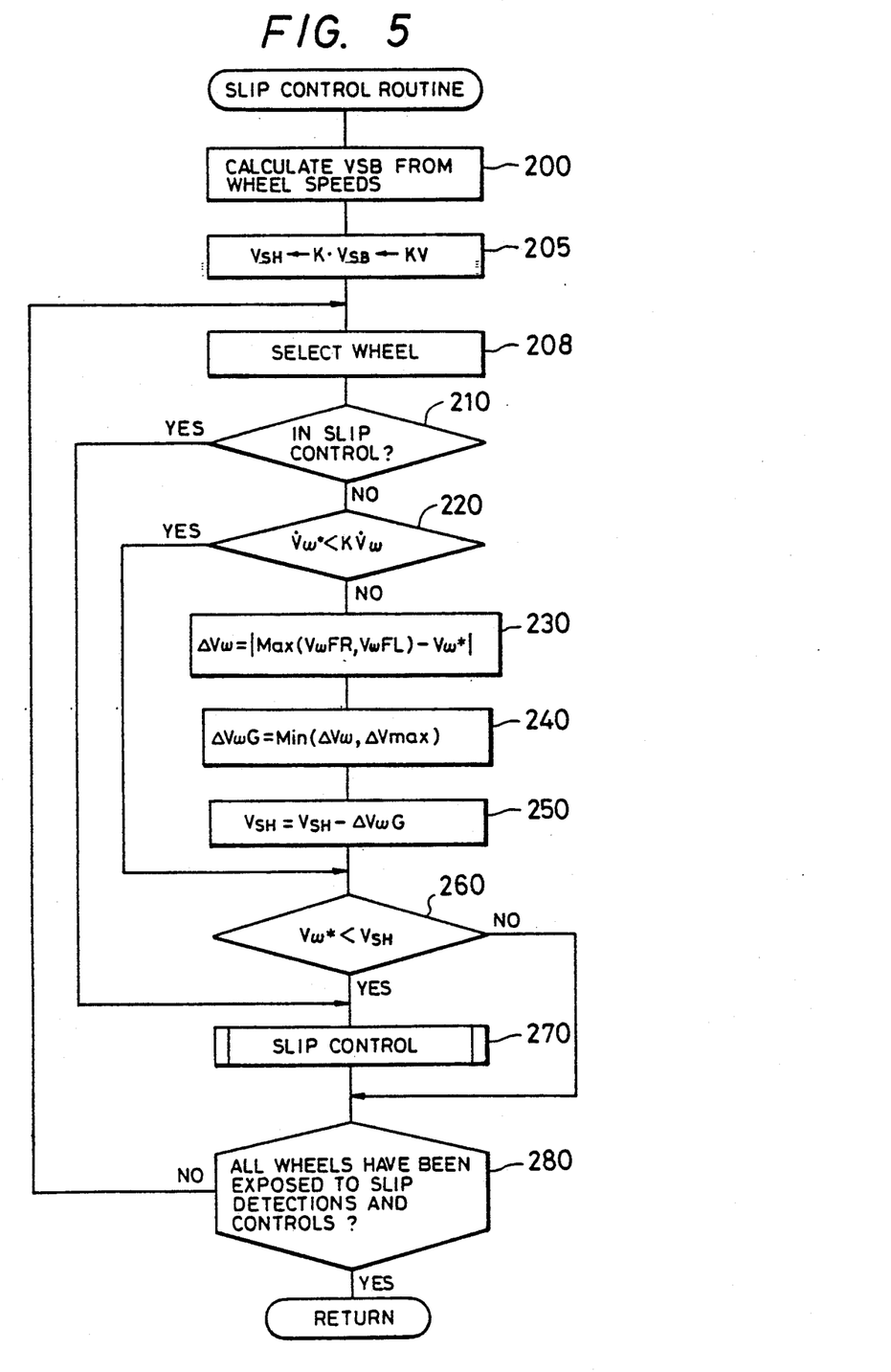
FIG. 5 is a flowchart of a program operating the electronic control circuit of FIG. 4.

The electronic control circuit 49 operates in accordance with a program stored in the ROM 78. This program contains a slip detection and control routine. FIG. 5 is a flowchart of the slip detection and control routine or program. The slip detection and control routine or program is periodically reiterated by a suitable process such as a timer-based interruption process. In the following description, the rotational speeds of the vehicle wheels 1, 3, 5, and 7 are represented as the corresponding speeds at the contacting ground or road surfaces.

As shown in FIG. 5, a first step 200 of the slip detection and control routine derives the current rotational speeds of the vehicle wheels 1, 3, 5, and 7 from the signals outputted by the vehicle wheel speed sensors 9, 11, 13, and 15. The step 200 calculates an estimated current vehicle speed $VSB_n$ from the current vehicle wheel rotational speeds by referring to the following equations.

$$V\omega 0 = \text{Max}(V\omega FR, V\omega FL, V\omega RR, V\omega RL) \ldots \quad (1)$$

$$VSB_n = \text{MED}(V\omega 0, VSB_{n-1} + \alpha up \cdot t, VSB_{n-1} - \alpha dw \cdot t) \ldots \quad (2)$$

In the equation (1), the character $V\omega 0$ represents the highest rotational speed, and the characters $V\omega FR$, $V\omega FL$, $V\omega RR$, $V\omega RL$ represent the rotational speeds of the front-right vehicle wheel 1, the front-left vehicle wheel 3, the rear-right vehicle wheel 5, and the rear-left vehicle wheel 7 respectively. In addition, the character Max represents an operator selecting the highest of the vehicle wheel rotational speeds $V\omega FR$, $V\omega FL$, $V\omega RR$, $V\omega RL$.

In the equation (2), the character $VSB_n$ represents an estimated current vehicle speed, and the character $VSB_{n-1}$ represents the estimated vehicle speed determined by the step 200 in the preceding execution cycle of the program. The characters $\alpha up$ and $\alpha dw$ represent preset constants corresponding to given accelerations and used in estimating a vehicle speed. For example, the given accelerations $\alpha up$ and $\alpha dw$ are equal to 0.5G and 1.0G respectively. The character t represents a calculation period or interval which essentially corresponds to an interval between successive execution cycles of the program. The character MED represents an operator selecting the intermediate of the speeds equal to $V\omega 0$, $VSB_{n-1} + \alpha up \cdot t$, $VSB_{n-1} - \alpha dw \cdot t$ respectively. In other words, the second highest or the second lowest of the three speeds is selected.

A step 205 subsequent to the step 200 calculates a slip detection reference value or speed VSH by referring to the following equation.

$$VSH = KSH \cdot VSB - KV \ldots \quad (3)$$

where the character KSH represents a preset factor of proportionality, and the character KV represents a preset speed constant. For example, the values KSH and KV are equal to 0.95 and 5Km/h respectively. In the equation (3), the character VSB represents the estimated vehicle speed $VSB_n$ determined in the preceding step 200. It is preferable that the reference value VSH is chosen to correspond to a slightly small slip ratio within a given range in view of response lags of the actuators 27, 29, 31, and 33 and in view of calculation lags of the electronic control circuit 49. After the step 205, the program advances to a step 208.

As will be made clear hereinafter, during one execution cycle of the slip detection and control program, the step 208 is executed four times. The step 208 sequentially selects one of the vehicle wheels 1, 3, 5, and 7 which will be subjected to slip detection and control. For example, the front-right wheel 1, the front-left wheel 3, the rear-right wheel 5, and the rear-left wheel 7 are sequentially selected in the first, second, third, and fourth executions of the step 208 respectively.

A step 210 following the step 208 determines whether or not the slip control is being performed with respect to the selected vehicle wheel. As will be made clear hereinafter, the slip control is performed when the result of a decision step 260 is positive and thus a step 270 is executed. Accordingly, the determination in the step 210 is performed by checking whether or not the result of the decision step 260 in the preceding execution cycle of the program was positive or by checking whether or not the step 270 was executed in the preceding execution cycle of the program. When the slip control is being performed, the program jumps to the step 270. When the slip control is not being performed, the program advances to a step 220.

The step 220 determines whether or not the rotational acceleration $V\omega*$ of the selected vehicle wheel is smaller than a reference value $KV\omega$. For example, the reference value $KV\omega$ equals −3G. The step 220 is to prevent the execution of the following process in cases where the coefficient of friction between the road surface and vehicle wheels at one side of the vehicle differs from the coefficient of friction between the road surface and vehicle wheels at the other side of the vehicle or in cases where only the brakes for vehicle wheels at one side of the vehicle are effective. When the vehicle wheel rotational acceleration $V\omega^*$ is equal to or greater than the reference value $KV\omega$, the program advances to a step 230. When the vehicle wheel rotational acceleration $V\omega^*$ is smaller than the reference value $KV\omega$, the program jumps to the step 260.

The step 230 calculates the difference $\Delta V\omega$ between the rotational speed $V\omega^*$ of the selected vehicle wheel and the highest of the rotational speeds $V\omega FR$ and $V\omega FL$ of the front or idler vehicle wheels 1 and 3 by referring to the following equation.

$$\Delta V\omega = |Max(V\omega FR, V\omega FL) - V\omega^*| \ldots \quad (4)$$

After the step 230, the program advances to a step 240.

The step 240 determines the value $\Delta V\omega G$ by referring to the following equation.

$$\Delta V\omega G = Min(\Delta V\omega, \Delta Vmax) \ldots \quad (5)$$

where the character Min represents an operator selecting the smaller of the speed values $\Delta V\omega$ and $\Delta Vmax$, and the character $\Delta VMax$ represents a preset constant. For example, the constant $\Delta Vmax$ corresponds to a speed of 7 Km/h. The speed value $\Delta V\omega G$ equals the speed value $\Delta V\omega$ when the speed value $\Delta V\omega$ is equal to or smaller than the constant $\Delta Vmax$. The speed value $\Delta V\omega G$ equals the constant $\Delta Vmax$ when the speed value $\Delta V\omega$ is greater than the constant $\Delta Vmax$. Accordingly, the constant $\Delta Vmax$ defines the upper limit of the value $\Delta V\omega G$. As will be made clear hereinafter, the value $\Delta V\omega G$ is used in correction of the reference speed VSH. The step 240 prevents the speed difference $\Delta V\omega$ from causing excessive correction of the reference speed VSH.

A step 250 subsequent to the step 240 corrects the slip detection reference value VSH in accordance with the value $\Delta V\omega G$ by referring to the following statement.

$$VSH = VSH - \Delta V\omega G \ldots \quad (6)$$

where the right-hand character VSH represents the slip detection reference value determined in the previous step 205, and the left-hand character VSH represents a new slip detection reference value obtained through the correction. After the step 250, the program advances to the step 260. The step 260 compares the rotational speed $V\omega^*$ of the selected vehicle wheel with the slip detection reference value VSH determined in the preceding step 250. The slip detection reference value VSH is chosen so that the selected vehicle wheel is excessively slipping when the rotational speed $V\omega^*$ of the selected vehicle wheel is smaller than the slip detection reference value VSH. When the rotational speed $V\omega^*$ of the selected vehicle wheel is actually smaller than the slip detection reference value VSH, that is, when the selected vehicle wheel is excessively slipping, the program advances to the step 270. When the rotational speed $V\omega^*$ of the selected vehicle wheel is equal to or greater than the slip detection reference value VSH, that is, when the selected vehicle wheel is not excessively slipping, the program advances to a step 280.

The step 270 performs slip control to prevent excessive slip of the selected vehicle wheel. The step 270 adjusts the actuator 27, 29, 31, or 33 associated with the selected vehicle wheel in accordance with a pattern which depends on the rotational speed of the selected vehicle wheel and on the rotational acceleration or deceleration of the selected vehicle wheel.

For example, the step 270 controls the actuator 27, 29, 31, or 33 associated with the selected vehicle wheel and thereby adjusts the hydraulic brake pressure applied to the selected vehicle wheel so that the actual rotational speed of the selected vehicle wheel can be lower than the estimated vehicle speed VSB by 15-20%. In other words, the actual vehicle wheel rotational speed can be held equal to 80-85% of the estimated vehicle speed VSB. In more detail, the step 270 calculates the degree of slip of the selected vehicle wheel from the current vehicle wheel speed $V\omega^*$ and the estimated vehicle wheel VSB, or from the acceleration or deceleration of the selected vehicle wheel drived through differentiation of the vehicle wheel speed $V\omega^*$. Then, the step 270 determines whether or not the degree of slip of the selected vehicle wheel is acceptable or unacceptable by comparing the degree of slip with a reference. When the degree of slip is unacceptable, the actuator associated with the selected vehicle wheel is adjusted to decrease the hydraulic brake pressure. When the degree of slip is acceptable, the actuator is controlled to increase or hold the hydraulic brake pressure. After the step 270, the program advances to the step 280.

It should be noted that the step 270 may control the actuators 27, 29, 31, and 33 in view of an induced speed difference between the vehicle wheels 1, 3, 5, and 7 during a turn of the vehicle. In one example, during slip control under vehicle cornering conditions, the rotational speeds of the vehicle wheels are held lower than the estimated vehicle speed VSB by values which are determined in dependence on the vehicle wheels in view of an induced speed difference between the vehicle wheels. In another example, during slip control under vehicle cornering conditions, the rotational speeds of the vehicle wheels are held within a preset range of percents of the estimated vehicle speeds which are corrected in dependence on the vehicle wheels in view of an induced speed difference between the vehicle wheels.

The step 280 determines whether or not all of the vehicle wheels have been exposed to the slip detection and control process in the present execution cycle of the program. Specifically, the step 280 determines whether or not all of the vehicle wheels have been selected by the step 208 in the present execution cycle of the program. When all of the vehicle wheels have been exposed to the slip detection and control process, the present execution cycle of the slip detection and control routine ends and the program returns to a main routine. When at least one of the vehicle wheels is not yet exposed to the slip detection and control process, the program returns to the step 208.

In the next execution cycle of the slip detection and control program, the step 210 determines whether or not the slip control is being performed by checking whether or not the step 270 was performed in the preceding execution cycle of the slip control program. When the slip control program is being performed, that is, when the step 270 was performed in the preceding execution cycle of the slip detection and control routine, the program jumps from the step 210 to the step 270. Accordingly, once the step 270 is executed, the steps 220-260 continue to be unexecuted until a decision process in the step 270 detects that the slip control ends.

Specifically, the end of the slip control is detected when the estimated vehicle speed VSB drops to or below a preset speed, for example, 3 Km/h, or when the stop switch 43 generates the OFF signal.

Figure 6:
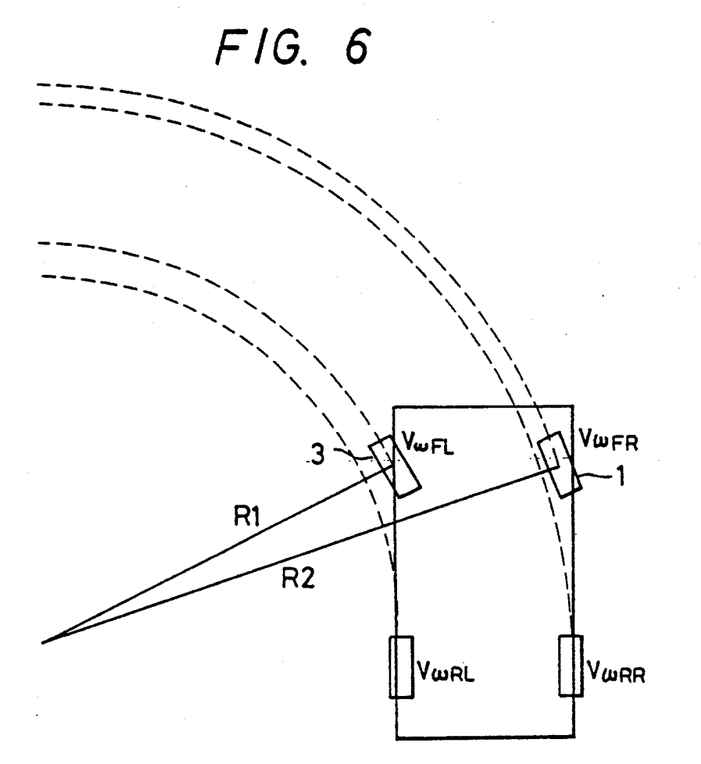
FIG. 6 is a diagram of a vehicle which is turning to the left.

In cases where the vehicle is turning to the left or counterclockwise as shown in FIG. 6, the radius R1 of turn of the front-left vehicle wheel 3 about the center of the vehicle turn is smaller than the radius R2 of turn of the front-right vehicle wheel 1 about the center of the vehicle turn. The rotational speed V$\omega$FL of the front-left vehicle wheel 3 differs from the rotational speed V$\omega$FR of the front-right vehicle wheel 1 in accordance with the difference between the turn radiuses R1 and R2 of the vehicle wheels 1 and 3. Accordingly, if a common reference value or range with respect to the estimated vehicle speed VSB is used in detecting excessive slips of the vehicle wheels 1 and 3, the inner vehicle wheel or the front-left vehicle wheel 3 would tend to be subjected to excessive slip control. As will be made clear hereinafer, the embodiment of this invention prevents such excessive slip control.

Figure 7:
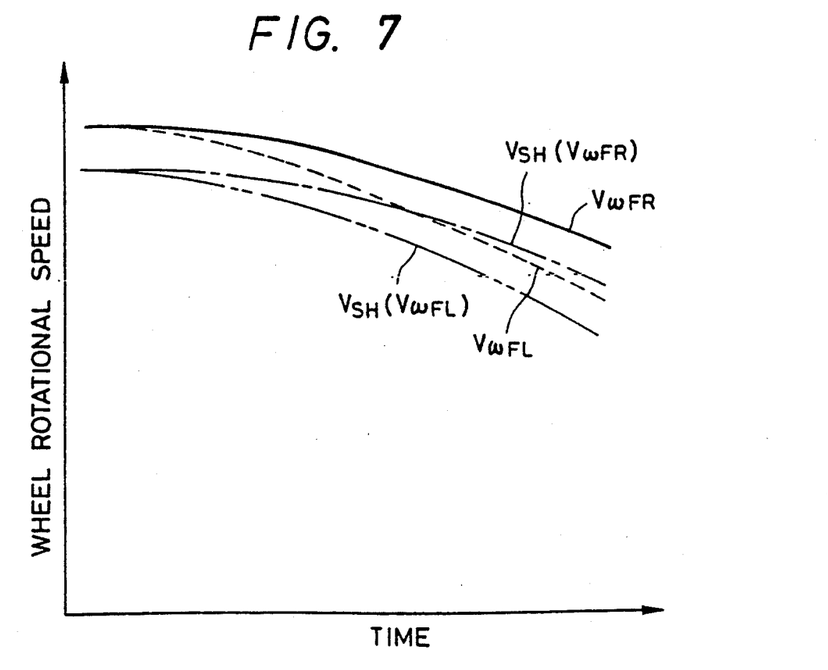
FIG. 7 is a diagram showing time-dependent variations in the rotational speeds of the front vehicle wheels and the slip detection reference values for the front vehicle wheels.

As shown in FIG. 7, when the vehicle turns to the left or counterclockwise, the rotational speed V$\omega$FR of the front-right vehicle wheel differs from the rotational speed V$\omega$FL of the front-left vehicle wheel. The slip detection reference value VSH(V$\omega$FR) for the front-right vehicle wheel and the slip detection reference value VSH(V$\omega$FL) for the front-left vehicle wheel are made different in accordance with the difference between the rotational speed V$\omega$FR of the front-right vehicle wheel and the rotational speed V$\omega$FL of the front-left vehicle wheel. Accordingly, it is possible to reliably detect excessive slip of either of the front-light and front-left vehicle wheels. In addition, the inner vehicle wheel or the front-left vehicle wheel is prevented from undergoing excessive slip control.

As understood from the previous description, in the embodiment of this invention, the vehicle wheels can be respectively subjected to reliable slip detections and controls when the vehicle is cornering or turning so that the rotational speeds of the right-hand vehicle wheels differ from the rotational speeds of the left-hand vehicle wheels. Since these slip detections and controls are performed in accordance with only the rotational speeds of the vehicle wheels, a special sensor such as a vehicle acceleration sensor or a steering sensor is unnecessary. In addition, the slip detections and controls respond to the difference between the rotational speeds of the vehicle wheels, the slip detections and controls are effective also during a straight travel of the vehicle under conditions where the rotational speeds of the vehicle wheels differ from each other due to a difference between the diameters of the tires or a difference between the air pressures within the tires.

The processes in the steps 200 and 205 correspond to the process in the reference speed calculation device M2 of the basic embodiment of FIG. 1. The process in the step 260 corresponds to the process in the comparator M3 in the basic embodiment of FIG. 1. The process in the step 270 corresponds to the process in the control device M4 in the basic embodiment of FIG. 1. The process in the step 230 corresponds to the process in the selection device M5 in the basic embodiment of FIG. 1. The process in the step 250 corresponds to the process in the correction device M6 in the basic embodiment of FIG. 1.

Various modifications may be made in the specific embodiment of this invention. For example, in the slip detections and controls for the rear vehicle wheels, the rotational speed of the output shaft of a transmission connected to a differential gear may be used as a mean rotational speed V$\omega$R of the rear vehicle wheels. In this case, the equation (1) is changed as follows.

$$V\omega 0 = Max(V\omega FR, V\omega FL, V\omega R)$$

In addition, the rear wheel actuators 31 and 33 are replaced by a single actuator for controlling the hydraulic brake units 21 and 23.

In a second modification, the four vehicle wheels are separated into two groups each having two vehicle wheels. Slip detection reference values are determined for the respective groups. In each group, the slip detection reference value is corrected in accordance with the higher of the rotational speeds of the two vehicle wheels.

In a third modification, the higher of the rotational speeds of the idler vehicle wheels is selected as a parameter for correcting the slip detection reference values of the other vehicle wheels.

In a fourth modification, a step similar to the step 250 is added between the steps 210 and 270 in the program of FIG. 5. In other words, the result of the decision step 210 is "yes", the program advances from the step 210 to the step 270 via the added step. As in the step 250, the added step corrects the slip detection reference value VSH in accordance with the value $\Delta V\omega G$. The added step uses the value $\Delta V\omega G$ which was determined immediately before the slip control step 270 was executed for the first time. To this end, the value $\Delta V\omega G$ which was determined immediately prior to the onset of the slip control remains held by the memory during the slip control. The added step keeps the slip detection reference value VSH corrected during the slip control.

What is claimed is:
1. A vehicle wheel slip control system comprising:
   (a) means for detecting rotational speeds of respective vehicle wheels;
   (b) means for calculating a slip detection reference value from the detected rotational speeds of the vehicle wheels;
   (c) means for determining acceptable slip ranges for the respective vehicle wheels in accordance with the calculated slip detection reference value;
   (d) means for comparing the rotational speeds of the vehicle wheels with the corresponding acceptable slip ranges respectively;
   (e) means, responsive to the comparing means, for performing slip controls of the respective vehicle wheels when the rotational speeds of the vehicle wheels reside outside the corresponding acceptable slip ranges respectively;
   (f) means for selecting a highest of at least two of the rotational speeds of the vehicle wheels;
   (g) means for calculating differences between the respective rotational speeds of the vehicle wheels and the selected highest vehicle wheel rotational speed;
   (h) means for correcting the slip detection reference value in accordance with the respective calculated differences;
   (i) means for judging whether or not said means (e) is currently performing the slip controlling; and
   (j) means for, when said means (e) is currently performing the slip controlling, suspending the select- ing, the calculating, and the correcting performed by said means (f), (g), and (h), respectively.

2. The system of claim 1 wherein the selecting means is operative to select a higher of rotational speeds of idler vehicle wheels.

3. The system of claim 1 further comprising means for limiting a degree of the correction by the correcting means.

4. The system of claim 1 wherein the correcting means is operative to determine new slip detection reference values which equal the slip detection reference value minus the differences respectively.

5. A vehicle wheel slip detection system comprising:
(a) means for detecting a rotational speed of a first vehicle wheel;
(b) means for comparing the rotational speed of the first vehicle wheel with a first reference speed and thereby detecting unacceptable slip of the first vehicle wheel;
(c) means for detecting rotational speed of a second vehicle wheel;
(d) means for comparing the rotational speed of the second vehicle wheel with a second reference speed and thereby detecting unacceptable slip of the second vehicle wheel;
(e) means for determining a difference between the rotational speeds of the first and second vehicle wheels;
(f) means for differentiating the first and second reference speeds in accordance with the difference between the rotational speeds of the first and second vehicle wheels;
(g) means for performing slip control of the first vehicle wheel when the unacceptable slip of the first vehicle wheel is detected by said means (b);
(h) means for performing slip control of the second vehicle wheel when the unacceptable slip of the second vehicle wheel is detected by said means (d);
(i) means for judging whether or not said means (g) is currently performing the slip controlling;
(j) means for, when said means (g) is detected by said means (i) as currently performing the slip controlling, suspending said determining and said differentiating performed by said means (e) and (f);
(k) means for judging whether or not said means (h) is currently performing the slip controlling; and
(l) means for, when said means (h) is currently performing the slip controlling, suspending said determining and said differentiating performed by said means (e) and (f).

6. A vehicle wheel slip control system comprising:
(a) a plurality of sensors, each detecting a rotational speed of a detected vehicle wheel, the detected vehicle wheels including at least one pair including a left-side and a right-side vehicle wheel;
(b) means for calculating an estimated vehicle speed on the basis of a highest of the detected vehicle wheel speeds;
(c) means for calculating a first slip detection reference value on the basis of the estimated vehicle speed and a predetermined coefficient;
(d) means for calculating a higher of the detected vehicle wheel speeds of said pair of left-side and right-side vehicle wheels;
(e) means for calculating a difference between the calculated higher vehicle wheel speed and the detected vehicle wheel speed of each said vehicle wheels;
(f) means for correcting the first slip detection reference value in accordance with the respective calculated differences and thereby converting the first slip detection reference value into second slip detection reference values;
(g) means for comparing the detected vehicle wheel speeds with the second slip detection reference values; and
(h) means for controlling slip conditions of the respective vehicle wheels in accordance with results of said comparing.

7. The system of claim 6 wherein said pair of the left-side and right-side vehicle wheels comprise non-driving wheels.

8. The system of claim 6 further comprising means for calculating a rotational acceleration of the respective vehicle wheels on the basis of the detected vehicle wheel speeds, means for comparing the calculated vehicle wheel accelerations with a predetermined value, and means for, when the calculated vehicle wheel accelerations are smaller than the predetermined value, cancelling the calculations and the correction performed by said means (d), (e), and (f).

9. The system of claim 6 further comprising means for limiting said differences so that said differences are equal to or smaller than a predetermined upper limit.

10. The system of claim 6 further comprising means for judging whether or not said means (h) is currently performing the slip controlling, and means for, when said means (h) is currently performing the slip controlling, cancelling the calculations and the correction performed by said means (d), (e), and (f).

11. The system of claim 6 wherein the second slip detection reference values are equal to the first slip detection reference value minus the calculated difference respectively.

12. A vehicle wheel slip control system comprising:
(a) a plurality of sensors, each detecting a rotational speed of a detected vehicle wheel, the detected vehicle wheels including a pair of non-driven, front wheels including a left-side and a right-side vehicle wheel;
(b) means for calculating an estimated vehicle speed on the basis of a highest of the detected vehicle wheel rotational speeds;
(c) means for calculating a first slip detection reference value on the basis of the estimated vehicle speed and a predetermined coefficient;
(d) means for calculating a higher of the detected vehicle wheel speeds of said pair of the left-side and right-side vehicle wheels;
(e) means for calculating a difference between the calculated higher vehicle wheel speed, and the detected vehicle wheel speed of each said vehicle wheels detected by said sensors;
(f) means for correcting the first slip detection reference value in accordance with the respective calculated differences and thereby converting the first slip detection reference value into second slip detection reference values;
(g) means for comparing the detected vehicle wheel speeds with the second slip detection reference values; and
(h) means for controlling slip conditions of the respective vehicle wheels in accordance with results of said comparisons.

13. The system of claim 12 further comprising means for calculating rotational accelerations of the respective vehicle wheels on the basis of the detected vehicle wheel speeds, means for comparing the calculated vehicle wheel accelerations with a predetermined value, and means for, when the calculated vehicle wheel accelerations are smaller than the predetermined value, cancelling the calculations and the correction performed by said means (d), (e), and (f).

14. The system of claim 12 further comprising means for limiting said differences so that said differences are equal to or smaller than a predetermined upper limit.

15. The system of claim 12 further comprising means for judging whether or not said means (h) is currently performing the slip controlling, and means for, when said means (h) is currently performing the slip controlling, suspending the calculating and the correcting performed by said means (d), (e), and (f).

16. A vehicle wheel slip control system comprising:
    (a) a plurality of sensors detecting rotational speeds of detected vehicle wheels respectively, the detected vehicle wheels including at least one pair including a left-side and a right-side vehicle wheel;
    (b) means for calculating an estimated vehicle speed on the basis of a highest of the detected vehicle wheel speeds;
    (c) means for calculating a first slip detection reference value on the basis of the estimated vehicle speed and a predetermined coefficient;
    (d) means for calculating a rotational acceleration of the respective vehicle wheels on the basis of the detected vehicle wheel speeds;
    (e) means for comparing the calculated vehicle wheel accelerations with a predetermined value;
    (f) means for calculating turn condition values on the basis of the detected vehicle wheel speeds, the turn condition values representing a condition of turning of the vehicle;
    (g) means for, when the vehicle wheel accelerations are greater than the predetermined value, correcting the first slip detection reference value in accordance with the turn condition values and thereby converting the first slip detection reference value into second slip detection reference values;
    (h) means for comparing the detected vehicle wheel speeds with the second slip detection reference values; and
    (i) means for controlling slip conditions of the respective vehicle wheel in accordance with results of the comparisons between the detected vehicle wheel speeds and the second slip detection reference values.

17. The system of claim 16 wherein each of the turn condition values corresponds to a difference between a highest of the detected vehicle wheel speeds of a pair of left-side and right-side wheels and each of the detected vehicle wheel speeds.

18. The system of claim 17 wherein said pair of the left-side and right-side vehicle wheels comprise non-driving wheels.

19. The system of claim 17 further comprising means for limiting said differences so that said differences are equal or smaller than a predetermined upper limit.

20. The system of claim 15 further comprising means for, when the vehicle wheel accelerations are smaller than the predetermined value, cancelling the calculation and the correction performed by said means (f) and (g) and controlling the slip conditions of the respective vehicle wheels in accordance with the first slip detection reference value.

21. The system of claim 15 further comprising means for determining whether or not said means (i) is currently performing the slip controlling, and means for, when said means (i) is currently performing the slip controlling, suspending the calculating and the correcting performed said means (f) and (g).

* * * * *